March 26, 1968  C. L. JARRETT  3,374,527

METHOD OF MAKING DISPENSING CONTAINER

Original Filed Oct. 15, 1963  3 Sheets-Sheet 1

INVENTOR.
CARL L. JARRETT
BY Harold R. Beck
ATTORNEY

March 26, 1968  C. L. JARRETT  3,374,527
METHOD OF MAKING DISPENSING CONTAINER
Original Filed Oct. 15, 1963  3 Sheets-Sheet 2

INVENTOR.
CARL L. JARRETT
BY Harold P. Beck
ATTORNEY

March 26, 1968 C. L. JARRETT 3,374,527
METHOD OF MAKING DISPENSING CONTAINER
Original Filed Oct. 15, 1963 3 Sheets-Sheet 3
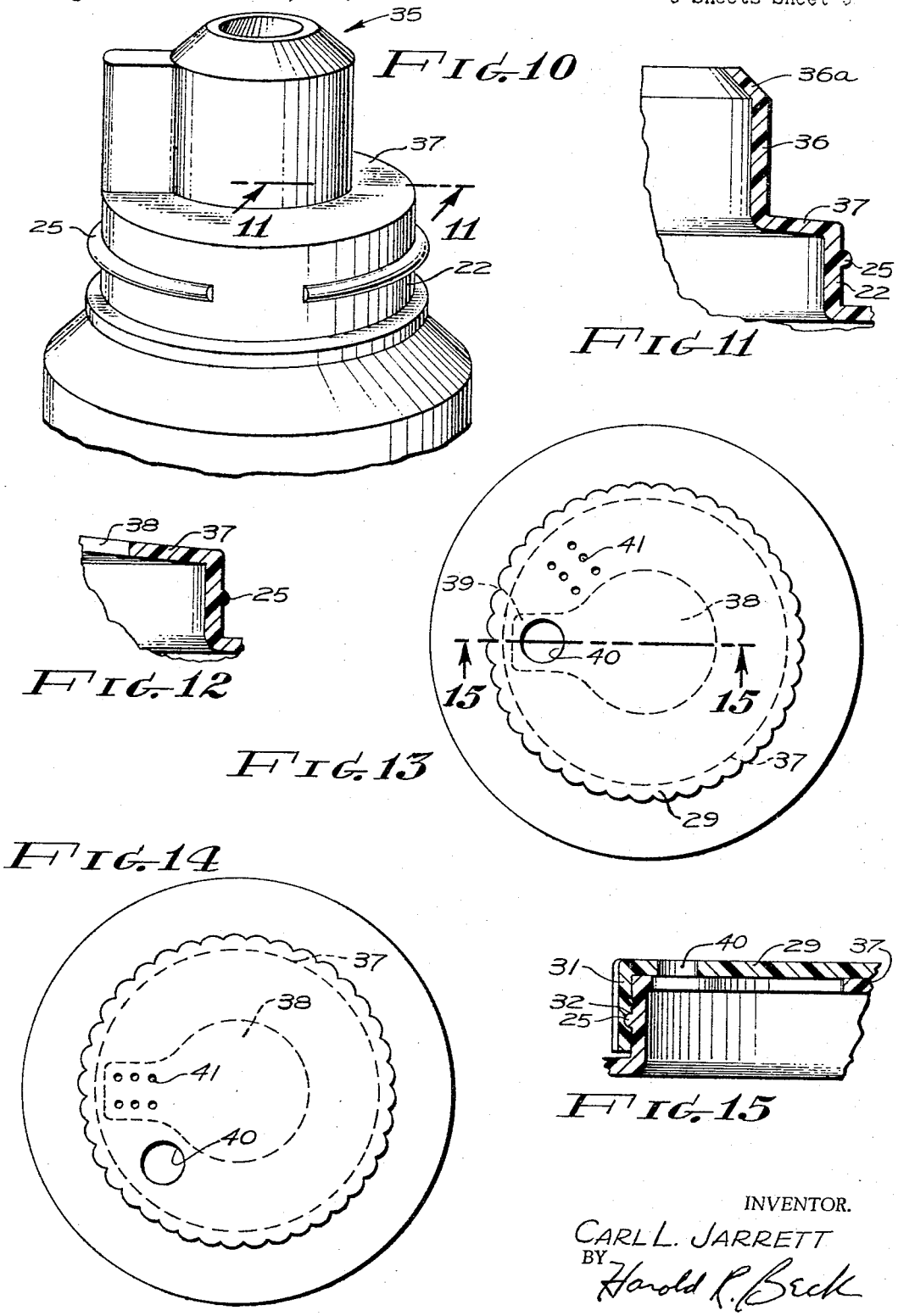
INVENTOR.
CARL L. JARRETT
BY Harold R. Beck
ATTORNEY United States Patent Office 3,374,527
Patented Mar. 26, 1968

3,374,527
METHOD OF MAKING DISPENSING
CONTAINER
Carl L. Jarrett, Kansas City, Mo., assignor to Consolidated Thermoplastics Company, Los Angeles, Calif., a corporation of Delaware
Original application Oct. 15, 1963, Ser. No. 316,327, now Patent No. 3,255,937, dated June 14, 1966. Divided and this application Sept. 18, 1964, Ser. No. 404,997
1 Claim. (Cl. 29—434)

ABSTRACT OF THE DISCLOSURE

A method for fabricating a plastic container having a body portion and a cap portion wherein a seal is effected between the body portion and cap portion by flexing flanges on the upper end of the body portion inwardly thereof when the cap is attached to the body portion.

---

This is a division of application Ser. No. 316,327 filed Oct. 15, 1963, now U.S. Patent No. 3,255,937.

The present invention is directed to a method of making a plastic dispensing container.

It is desirable to have a two piece plastic container which dispenses material therefrom through a top opening sealable by a closure member joined to the container body so that removal of the closure member is difficult. The closure member preferably is rotatable to and from open to closed positions.

It has been the practice in the past to blow mold the body portion of the container and provide a two or three piece closure member. Frequently the neck of the container body portion receives an insertable plug and an overcap is mounted on the container neck and plug. The overcap is rotatable to align holes in the cap and plug for dispensing a commodity from the container. Containers of this character are expensive since it is necessary to separately mold and assemble the various parts on the plug and overcap to the container after filling the container. Furthermore, the quantity of plastic necessary to form this type container is substantial, thus increasing the cost of the finished container. The present invention provides a two piece container wherein the container body is formed in a unique shape and is adapted to receive a single piece closure, which is rotatably mounted on the container for movement from and to dispensing and closed positions.

The method of fabricating the container according to the present invention is unique in that it includes the utilization of a portion of the plastic material which is normally a waste portion on the container body. This waste portion is utilized for supplying the opening in the top of the container by a simple trimming operation. The container neck portion and opening may also be formed without the waste portion by injection molding the top of the container body and extruding an integral parison which is subsequently blown to the desired shape.

The apparatus used for fabricating a container according to the present invention includes several well-known types used in the blow molding industry. These apparatuses extrude a parison (horizontally or vertically primarily), enclose the parison in mold shells having an internal cavity of the desired configuration, and introduce pressurized air (other gas or fluid) into the parison to expand the parison against the cavity. The head portion, including the neck, of the container may be injection molded prior to extruding the parison thereby minimizing the secondary trimming, coring, etc., operations necessary on the blown parison.

In the drawings I have shown the present preferred embodiment of my invention in which:

FIGURE 10 shows a modified form of the invention wherein the upper end of the container body is provided with a keyhole shaped opening;

FIGURE 11 is a cross section taken on line 11—11 of FIGURE 10;

FIGURE 12 is a view similar to FIGURE 11 with the waste portion removed from the container body;

FIGURE 13 is a top plan view of the modified form of the container and closure with the closure in a first opened or dispensing position;

FIGURE 14 is a view similar to FIGURE 13 with the closure in a second open or dispensing position;

FIGURE 15 is a cross section taken on line 15—15 of FIGURE 13; and,

Briefly, the present invention is directed to a method for fabricating a plastic container formed from polyethylene, polypropylene, vinyl, etc., and adapted to dispense a commodity contained therein. The container includes a chamber formed by side and bottom walls of any desired configuration, a neck-like structure on the upper end of the side wall, a peripheral flange integral with the neck-like structure extending inwardly toward the chamber and the longitudinal axis of the container. The inner edges of the flange form a dispensing and filling passage for the chamber. The inner edges of the peripheral flange have a variety of configurations but must provide a flange having areas which extend radially inwardly a greater distance than other areas of the flange. Thus, the flange has areas that extend radially at varying distances. A closure is provided for the top of the container and has at least one dispensing opening. The closure is rotatably mounted on the container and the opening in the closure is positionable over either an open portion of the dispensing passage or over a portion of the peripheral flange. When the opening in the closure is over the peripheral flange, the container is in a closed or non-dispensing position and when the closure opening and dispensing passage are aligned, the container is in an open or dispensing position.

The method according to the present invention includes the formation of a plastic mass into a plastic container body in the conventional manner by extruding a parison and blowing the parison to conform with the inside surfaces of a mold. The container body is blown with a neck extension on the upper end. This neck extension has a cross-sectional periphery which is less than the upper end cross section of the container body. The neck extension is connected to the container body by a peripheral flange extending substantially normal to the axis of the container body. This container neck extension is severed from the container body to provide an opening in the upper end of the container body for filling and dispensing. The specific configuration of the neck extension determines the configuration of the opening in the container.

Figure 1:
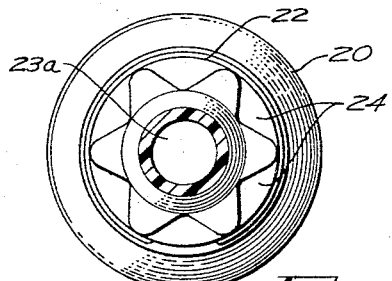
FIGURE 1 is a top plan view of a blown container body after it is removed from the mold shells at a blow molding station.
Figure 2:
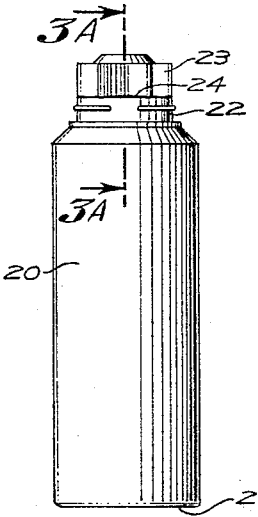
FIGURE 2 is a side elevation view of the container body of FIGURE 1.

Referring specifically to the drawings and to the preferred embodiment shown in FIGURES 1 through 9, the container body has a hollow chamber enclosed by a side wall 20 and a bottom wall 21. The upper end of the side wall has a neck portion 22. The body 20, bottom wall 21 and neck portion 22 can be of any desired configuration but illustratively they are shown as a round container. A hollow neck extension 23 is provided integral with the upper end of the container neck portion, and FIGURES 1 and 2 illustrate its form as removed from the blow mold. The neck extension 23 is integrally joined with the neck portion 22 by a radially extending, peripheral flange 24. The flange 24 extends from the upper edge of neck portion 22 inwardly, substantially horizontally, and is joined with the lower end of the neck extension 23. A control opening 23a in the neck extension provides ingress for blowing the parison to its blow molded form.

I have shown the neck portion in its preferred embodiment having an outstanding rib 25 on its outer surface to which the closure is removably attached in the manner to be described hereinafter. The rib 25 can be formed of two coextensive, spaced ribs to provide stops for rotation of the closure thereon.

The flange 24 preferably extends upwardly from the horizontal about 5° in the preferred embodiment (see FIGURE 4), although it is within the scope of this invention to vary this angle between 2° and 8° from the horizontal. The purpose of this angle is to insure sealing between the flange and closure as will be described hereinafter.

Figure 3:
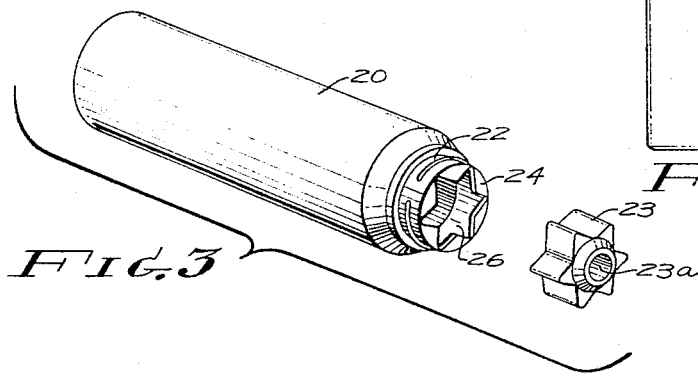
FIGURE 3 is a perspective of the container body of the prior figures, with the waste portion removed.
Figure 3A:
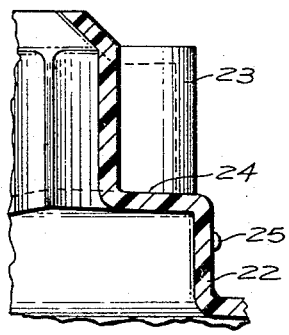
FIGURE 3A is a cross section taken on line 3A—3A of FIGURE 2.
Figure 4:
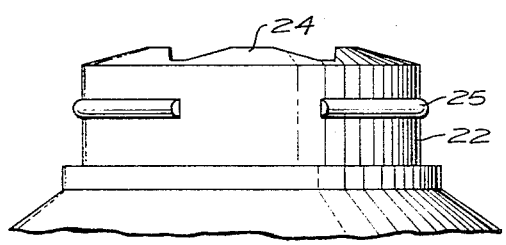
FIGURE 4 is a fragmentary side elevation view of the container body, specifically the upper end thereof, with the waste portion removed and the opening cored out.
Figure 5:
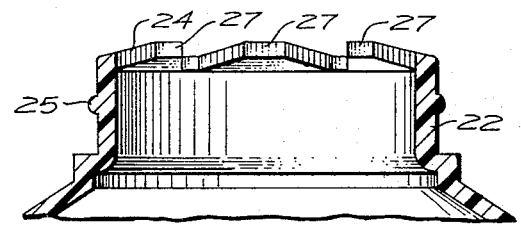
FIGURE 5 is a vertical cross section of the container upper end, taken on the axis of the container body, with the waste portion removed, showing the maximum extent of the top opening in the container body.

Referring to FIGURE 3, the neck extension 23 is severed from the container body after molding, and specifically from the neck portion 22 by a cutting knife or the like by severing the extension 23 at its point of juncture with the flanges 24. Preferably the cutting knife is at the same angle from the horizontal as the flange 24.

In the embodiment shown in FIGURES 1–3, I have shown a star shaped opening 26 which is formed upon removal of the neck extension 23. In the structure shown in FIGURES 4 through 9 this star shaped opening 26 has been cored out in a circular configuration to blunt the points at 27 to provide a minimum filling opening in the center of the container body. Although this coring operation to blunt the points is not necessary, many consumers require a minimum filling diameter for the container.

FIGURES 6 through 9 illustrate a preferred form of closure 28 which has a flat top portion 29 having a plurality of equally spaced holes 30 therein and a depending integral skirt 31 knurled on its outer surface for gripping by the user and having an internal groove 32 (preferably discontinuous) which receives the rib 25 on the neck of the container. It should be noted that when the closure 28 is snapped onto the upper end of the neck 22 it is held in position by the rib or ribs 25 entering the groove 32 and the flange 24 is forced or bent downwardly until it is substantially horizontal and normal to the axis of the container (see FIGURE 6). Due to the memory of plastic materials, such as polyethylene and polypropylene, the flange 24 is tightly engaged against the under surface of the top wall portion 29 of the closure thereby providing an effective seal between the portion 29 and flange 24 to prevent the commodity in the container from sifting out when the closure is in the closed position.

Figure 8:
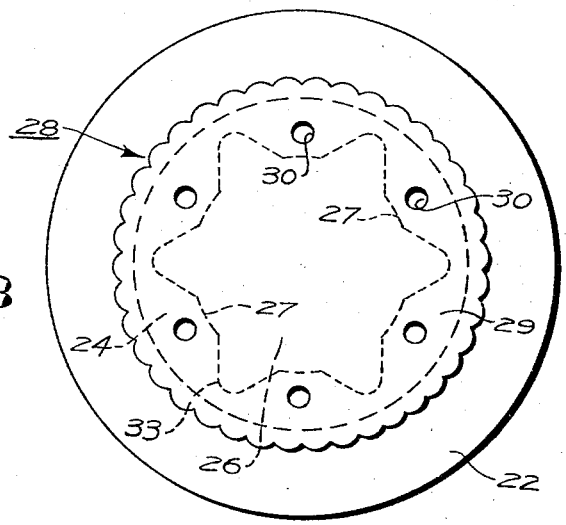
FIGURE 8 is a plan view of the container showing the closure in non-dispensing or closed position.
Figure 9:
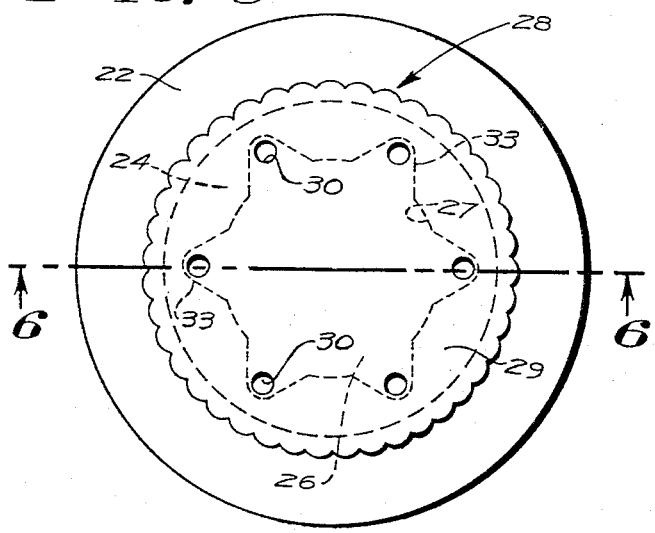
FIGURE 9 is similar to FIGURE 8 but showing the closure in dispensing or opened position.

Referring to FIGURES 8 and 9, the holes 30 are spaced in a circular radial configuration such that upon rotation of the closure 28 by a sliding movement of the groove 32 along the rib 25, the holes 30 are alternately positioned in the apexes 33 of the star opening 26 (see FIGURE 9) or, upon further rotation of the closure, the openings 30 are positioned over the flange 24, and since the flange is biased tightly against the under surface of the wall 29 of the closure, the openings 30 are respectively sealed and the commodity cannot be dispensed from the container by inversion of the container.

FIGURE 10 illustrates a modified form of the invention, patterned after the form previously described, in which the opening and neck extension have a cross sectional keyhole shape 35, including a side wall portion 36 and an upper end 36a forming an opening which receives the blowing mandrel in the blow molding machine to blow the parison. A peripheral flange 37 is integral with the upper end 22 of the container neck and joins the neck extension 35 at its inner extremity. FIGURE 12 illustrates a cross section view similar to FIGURE 11, in which the neck extension 35 has been removed thereby providing an opening 38 having a keyhole shape. The neck extension is removed by a cutting knife or the like as previously described. As noted in FIGURE 13, it is important that the slot portion 39 of the keyhole opening be closer to the edge of the neck 22 than is the circular portion 38 of the keyhole. The circular portion 38 provides the minimum size filling opening as previously described. The flanges 37 are preferably formed at a slight angle to the horizontal in the same way as hereinbefore described with respect to the preferred embodiment.

FIGURES 13–15 illustrate a closure usable on the modified form of the invention similar in construction to the previously described closure with the exception of the specific construction of the openings in the closure. In this embodiment a large opening 40 is provided in the closure, and a plurality of small openings 41, closely grouped together, are provided adjacent thereto. The openings 40 and 41 are located on the closure such that upon rotation of the closure by sliding the groove 32 on rib 25, the opening 40 can be positioned over the slot portion 39 of the opening in the container body to dispense a solid stream of the commodity from the container (see FIGURE 13), or upon further rotation of the closure the small holes 41 can be positioned over the slot portion 39 of the opening in the container body (see FIGURE 14) such that the commodity from the container can be sprinkled out in fine streams from the container. Upon further rotation of the closure the openings 40 and 41 can be positioned away from slot portion 39 of the opening and over flange 37 of the container thereby preventing dispensing from the container by inversion thereof.

The flange 37 is bent or forced downwardly by the closure, as shown in FIGURE 15, to insure an effective seal between the closure and flange to prevent "sifting" of the commodity from the container.

Figure 16:
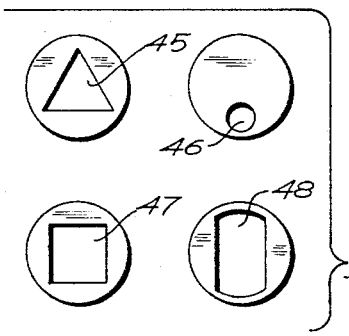
FIGURE 16 shows various other modified forms of my invention and specifically shows a top plan view of the container body having triangular, circular, square and diagonal openings therein.
Figure 6:
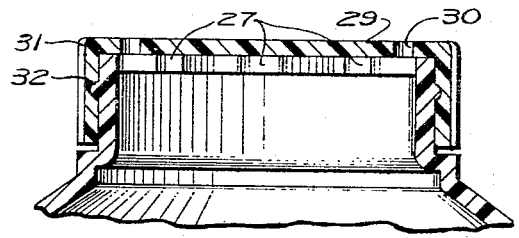
FIGURE 6 is a cross section taken on line 6—6 of FIGURE 9, showing a closure member positioned on the upper end of the container body.
Figure 7:
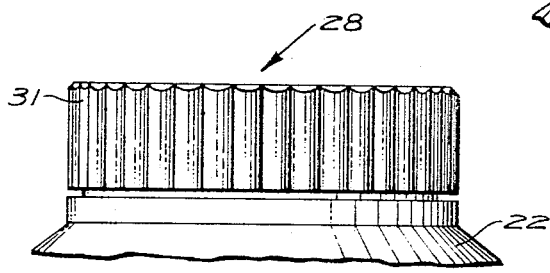
FIGURE 7 is a side elevation view of the closure member positioned on the upper end of the container.

FIGURE 16 illustrates various other modified opening configurations for the container body and all of these openings are fabricated in the manner described above with respect to the star shaped and keyhole shaped openings. Specifically the figure shows a plan view of a triangular opening 45, an offset circular opening 46, a square opening 47 and a slot opening 48. It may be appreciated that the closures shown in the other figures or various other modified closures can be used with the openings shown in FIGURE 16.

In fabricating a container according to the present invention, it is merely necessary to use a blow mold having a configuration of the desired form and to blow a plastic parison against the internal surfaces of the container.

The neck extension 23 or 35 is then removed by severing it from the container body with a cutting knife or the like. The closure members are preferably injection molded from plastic materials in a well-known manner.

While I have described the present preferred embodiment of my invention, it may be otherwise embodied within the scope of the following claim.

I claim:

1. A method for fabricating a plastic container having a body portion with an integral top neck portion and a neck extension portion integral with the neck portion, comprising:
   (a) positioning a mold to receive a plastic parison, said mold having cavities defining said body portion, said top neck portion and said neck extension portion, the cavities being substantially axially aligned, the neck extension portion cavity having surfaces more remote from the longitudinal axis of the cavity defining the top neck portion including surfaces defining a peripheral, radially extending flange joining the top neck portion with said neck extension portion defining cavity;
   (b) positioning a hollow plastic parison inside said mold cavities;
   (c) introducing pressurized fluid internally of said parison to expand it into conformity with the surfaces of the cavities, including expansion in the neck extension cavity to form a part of the container which has wall sections more remote from the longitudinal axis of the part than other wall sections, and including expansion of part of the parison into conformity with the surfaces defining said flange to form a continuous, peripheral, radially and slightly axially extending flange joining the top neck portion with the neck extension portion;
   (d) removing the molded article from the mold after the plastic has rigidified;
   (e) removing only the neck extension portion from the molded article by severing the junction line between said flange and said wall sections of the neck extension portion to provide an opening in the neck portion defined by the inner edge of said flange which has flange parts extending radially inward more than other flange parts;
   (f) positioning a closure member adjacent said neck portion, said closure member having a perforated planar wall adapted to close the opening in said neck portion, and an integral peripheral skirt adapted to engage the outer wall of the neck portion to rotatably mount the closure member on the neck portion;
   (g) forcing the closure member toward the neck portion and into engagement with said flange; and,
   (h) deflecting said flange axially inwardly of the neck portion until the closure skirt engages and holds the closure member on said neck portion, said flange resiliently engaging the planar wall of the closure member to provide an effective seal therebetween, and said closure member being rotatably mounted to permit alignment of the perforation in the closure wall with the opening in the neck portion.

References Cited
UNITED STATES PATENTS 1,081,555  12/1913  Russell.
3,084,396  4/1963  Abt _____ 264—98

ROBERT F. WHITE, *Primary Examiner.*

A. R. NOE, *Assistant Examiner.*